US012290760B2

(12) United States Patent
Liu

(10) Patent No.: US 12,290,760 B2
(45) Date of Patent: May 6, 2025

(54) LUMINOUS FRISBEE

(71) Applicant: Qiku Smart-Link Technology(Shenzhen) Co., Ltd, Shenzhen (CN)

(72) Inventor: Weixing Liu, Shenzhen (CN)

(73) Assignee: Qiku Smart-Link Technology(Shenzhen) Co., Ltd., Shenzhen (CN)

(*) Notice: Subject to any disclaimer, the term of this patent is extended or adjusted under 35 U.S.C. 154(b) by 212 days.

(21) Appl. No.: 18/183,862

(22) Filed: Mar. 14, 2023

(65) Prior Publication Data

US 2023/0211246 A1 Jul. 6, 2023

(30) Foreign Application Priority Data

Feb. 6, 2023 (CN) ........................ 202320240268.7

(51) Int. Cl.

*A63H 27/00* (2006.01)
*F21V 33/00* (2006.01)
*F21Y 115/10* (2016.01)

(52) U.S. Cl.

CPC ........... *A63H 27/12* (2013.01); *F21V 33/008* (2013.01); *F21Y 2115/10* (2016.08)

(58) Field of Classification Search

CPC .... A63H 33/18; A63H 27/12; F21V 23/0442; F21V 23/0492; F21V 33/008
See application file for complete search history.

(56) References Cited

U.S. PATENT DOCUMENTS 3,720,018 A * 3/1973 Peterson ................ A63H 33/18 446/47
3,786,246 A * 1/1974 Johnson ................. A63H 33/18 473/588
3,798,834 A * 3/1974 Samuel .................. A63H 33/18 362/802
3,812,614 A * 5/1974 Harrington ............ A63H 33/18 473/588
3,948,523 A * 4/1976 Michael ................. A63H 27/12 473/588
4,132,031 A * 1/1979 Psyras .................... A63H 33/18 446/47
4,135,324 A * 1/1979 Miller .................... A63H 33/18 473/588
4,145,839 A * 3/1979 Sampietro .............. A63H 33/18 446/47

(Continued)

FOREIGN PATENT DOCUMENTS

CN 102905766 A 1/2013
CN 204952282 U 1/2016
CN 209204675 U 8/2019

*Primary Examiner* — Ismael Negron

(57) ABSTRACT

A frisbee, including a main body, a plurality of LEDs, and a battery. The main body includes a central disc portion and an outer ring periphery. The plurality of LEDs are arranged on the central disc portion. The central disc portion is provided with a plurality of light-guiding ribs. One end of each of the plurality of light-guiding ribs is arranged close to the plurality of LEDs, and the other end of each of the plurality of light-guiding ribs is connected to the outer ring periphery. The plurality of light-guiding ribs and the outer ring periphery are both made of an light-guide material.

19 Claims, 2 Drawing Sheets

(56) References Cited

U.S. PATENT DOCUMENTS

| | | | | | |
|---|---|---|---|---|---|
| 4,248,010 | A * | 2/1981 | Fox | A63H 33/18 | 473/588 |
| 4,301,616 | A * | 11/1981 | Gudgel | A63H 33/18 | 446/47 |
| 4,307,538 | A * | 12/1981 | Moffitt | A63H 33/18 | 446/47 |
| 4,431,196 | A * | 2/1984 | Kutnyak | A63H 33/18 | 473/588 |
| 4,435,917 | A * | 3/1984 | Lee | A63H 33/18 | 446/47 |
| 4,607,850 | A * | 8/1986 | O'Riley | A63H 33/18 | 473/588 |
| 5,290,184 | A * | 3/1994 | Balogh | A63H 33/18 | 446/485 |
| 5,319,531 | A * | 6/1994 | Kutnyak | A63H 33/18 | 473/588 |
| 5,611,720 | A * | 3/1997 | Vandermaas | A63B 65/10 | 446/485 |
| 5,984,753 | A * | 11/1999 | Perez | A63H 33/18 | 473/588 |
| 6,695,666 | B2 * | 2/2004 | Nikonorov | A63H 33/18 | 446/46 |
| 6,857,770 | B2 * | 2/2005 | Moore | A63H 33/18 | 446/46 |
| 8,858,289 | B2 * | 10/2014 | Forte | A63H 33/18 | 446/242 |
| 11,712,637 | B1 * | 8/2023 | Hoffberg | A63H 33/18 | 701/2 |
| 2023/0037021 | A1 * | 2/2023 | Hoang | A63H 33/18 | |

* cited by examiner

LUMINOUS FRISBEE

CROSS-REFERENCE TO RELATED APPLICATIONS

This application claims the benefit of priority from Chinese Patent Application No. 202320240268.7, filed on Feb. 6, 2023. The content of the aforementioned application, including any intervening amendments thereto, is incorporated herein by reference in its entirety.

TECHNICAL FIELD

This application relates to frisbees, and more particularly to a luminous frisbee.

BACKGROUND

Frisbee (also known as flying disc) has become increasingly popular in recent years. To facilitate the use at night, various luminous frisbees (with light-emitting function) have been developed. For example, the TOSY luminous frisbee includes a frisbee main body, 360 light-emitting diodes (LEDs), and a battery. The frisbee main body includes a disc part and an outer ring periphery. The 360 LEDs are uniformly arranged on the outer ring periphery to present a desirable luminous effect. The TOSY luminous frisbee has a cool and attractive appearance, but it also has a complex overall structure and high cost due to the arrangement of 360 LEDs. Hence, there is an urgent need to design a frisbee with a good luminous effect, as well as a simple overall structure and a low production cost.

SUMMARY

In view of the defects in the prior art, an object of this application is to provide a luminous frisbee (flying disc), which not only exhibits a good luminous effect at its outer ring periphery, but also has a simple overall structure, a low production cost, and better practicability.

To achieve the above object, this application provides a frisbee, comprising:

a main body;

a plurality of light-emitting diodes (LEDs); and a battery;

wherein the main body comprises a central disc portion and an outer ring periphery surrounding the central disc portion; the plurality of LEDs are arranged on the central disc portion; the central disc portion is provided with a plurality of light-guiding ribs; one end of each of the plurality of light-guiding ribs is arranged close to the plurality of LEDs, and the other end of each of the plurality of light-guiding ribs is connected to the outer ring periphery; and the plurality of light-guiding ribs and the outer ring periphery are both made of a light-guide material.

In an embodiment, a surface of each of the plurality of light-guiding ribs and an inner side of the outer ring periphery are both configured as opaque.

In an embodiment, the central disc portion is provided with a cover, and the plurality of LEDs are arranged in the cover.

In an embodiment, the cover is provided at a center of the central disc portion.

In an embodiment, the plurality of light-guiding ribs are uniformly arranged along a circumferential direction of the outer ring periphery.

In an embodiment, the number of the plurality of light-guiding ribs is the same as the number of the plurality of LEDs; and the plurality of LEDs are in one-to-one correspondence to the plurality of light-guiding ribs.

In an embodiment, the main body consists of a disc body and a ring body; the disc body comprises a disc portion and an inner frame portion; the ring body comprises an outer frame portion; the outer frame portion of the ring body is sleeved on an outer side of the inner frame portion of the disc body; the central disc portion is formed by the disc portion of the disc body; and the outer ring periphery is formed by the outer frame portion of the ring body.

In an embodiment, the disc body is formed by integral injection molding; and the ring body and the plurality of light-guiding ribs are formed by integral injection molding.

In an embodiment, the frisbee further comprises a vibration detection module.

In an embodiment, the frisbee further comprises a light control button.

In an embodiment, the frisbee further comprising:

a charging interface configured for charging of the battery;

wherein a waterproof rubber plug is provided on a position where the charging interface is located to cover the charging interface.

In an embodiment, the frisbee further comprising:

a clamping buckle;

wherein the clamping buckle comprises a clamping portion and a hanging portion; the clamping portion is configured for clamping with the main body; and the hanging portion is configured for hanging of the frisbee.

In an embodiment, the light-guide material is thermoplastic polyurethane (TPU) or thermoplastic elastomer (TPE).

The beneficial effects of the present disclosure are described below.

In the prior art, in which 360 LEDs are directly arranged on the outer ring periphery to render the outer ring periphery a luminous effect. In contrast, in this application, the LEDs are arranged on the central disc portion to emit light, and then the light is guided to the outer ring periphery made of a light-guiding material through the plurality of light-guiding ribs. By this arrangement, the outer ring periphery shows a better luminous effect. In this application, the whole outer ring periphery grows through the light guiding. In such cases, only a handful of LEDs are required to make the whole outer ring periphery have a good luminous ornamental effect. Therefore, the frisbee provided herein not only exhibits a good luminous effect at its outer ring periphery, but also has simple overall structure, a low production cost, and better practicability.

Figure 1:
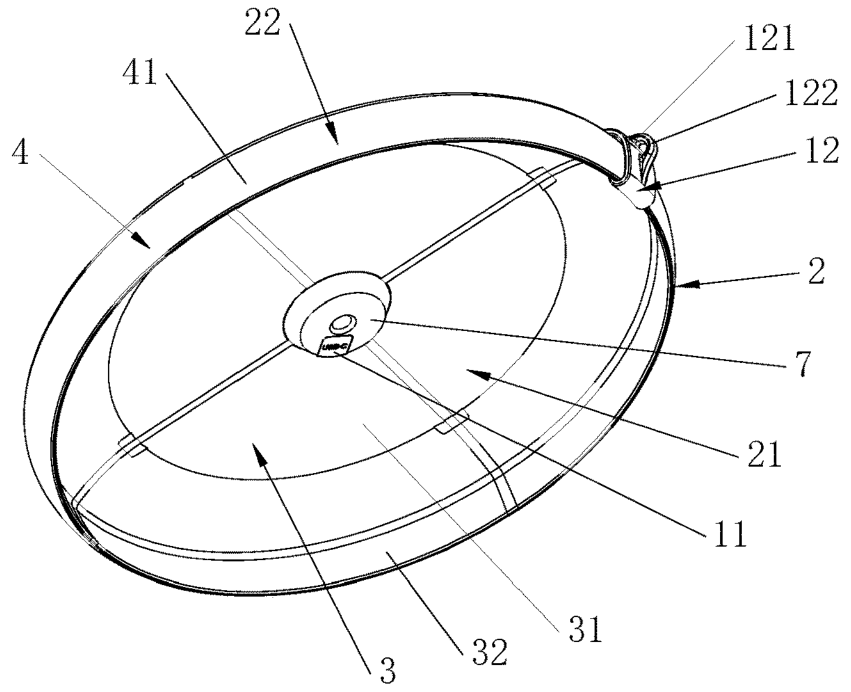
FIG. 1 is a schematic diagram of a luminous frisbee according to an embodiment of this disclosure.

In the drawings: 1, LED; 2, main body; 21, central disc portion; 22, outer ring periphery; 3, disc body; 31, disc portion; 32, inner frame portion; 4, ring body; 41, outer frame portion; 5, battery; 6, light-guiding rib; 7, cover; 8, vibration detection module; 9, light control button; 10, charging interface; 11, waterproof rubber plug; 12, clamping buckle; 121, clamping portion; and 122, hanging portion.

DETAILED DESCRIPTION OF EMBODIMENTS

Figure 2:
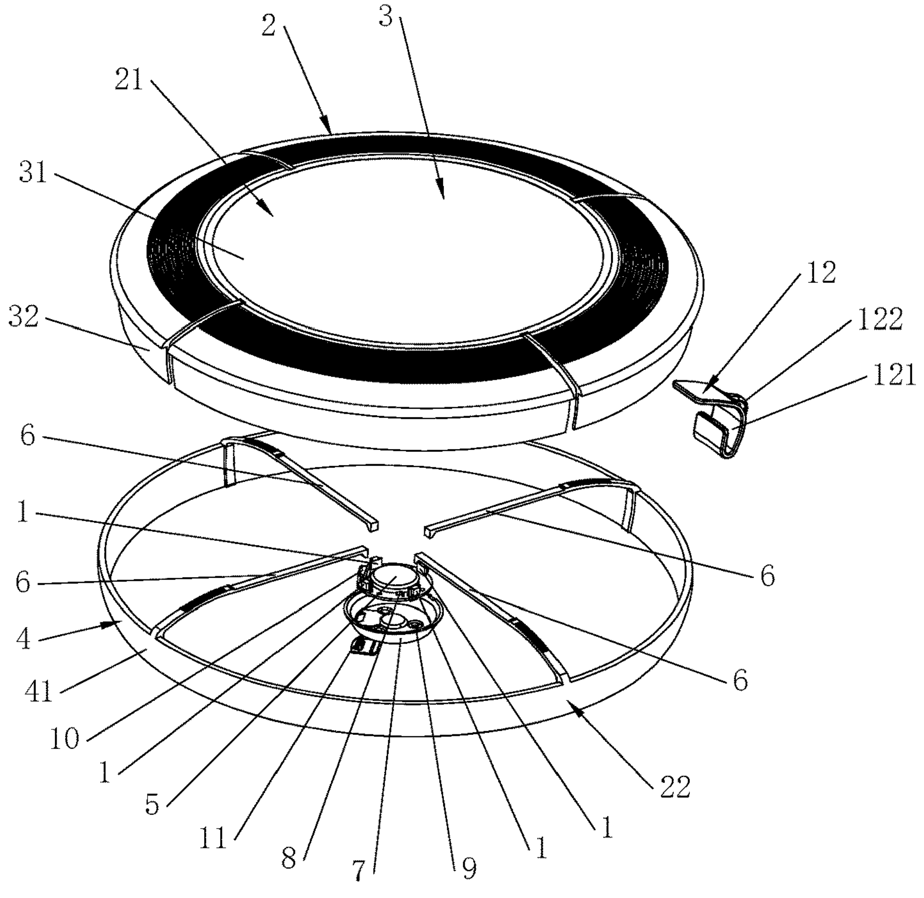
FIG. 2 is an exploded view of the luminous frisbee according to an embodiment of this disclosure.
Figure 3:
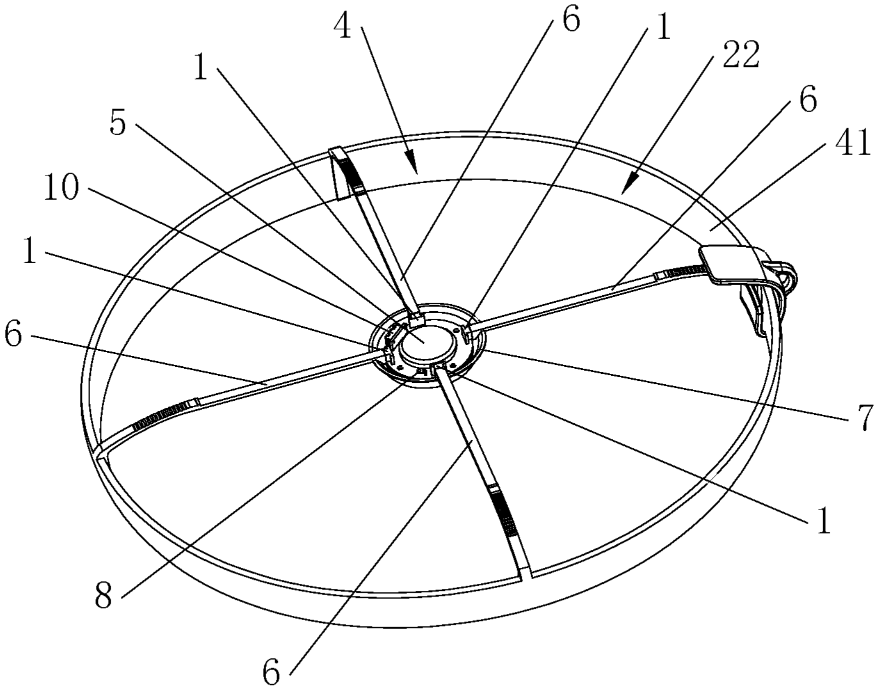
FIG. 3 is a schematic diagram of the luminous frisbee according to an embodiment of this disclosure after removing a disc body.

The present application will be further described below with reference to the embodiments and accompanying drawings. Referring to FIGS. 1-3, a frisbee is provided, which includes a main body 2, a plurality of (light-emitting diodes) LEDs 1, and a battery 5. The plurality of LEDs 1 can be single-color or multi-color RGB lights. The main body 2 includes a central disc portion 21 and an outer ring periphery 22. The plurality of LEDs 1 are arranged on the central disc portion 21, and the central disc portion 21 is provided with a plurality of light-guiding ribs 6. One end of each of the plurality of light-guiding ribs 6 is arranged close to the plurality of LEDs 1, and the other end of each of the plurality of light-guiding ribs 6 is connected to the outer ring periphery 22. The plurality of light-guiding ribs 6 and the outer ring periphery 22 are made of a light-guiding material. In the prior art, 360 LEDs 1 are directly arranged on the outer ring periphery 22 to render the outer ring periphery 22 a luminous effect. In contrast, in this application, the LEDs 1 are arranged on the central disc portion 21 to emit light, and then the light is guided to the outer ring periphery 22 made of a light-guiding material through the plurality of light-guiding ribs 6. By this arrangement, the outer ring periphery 22 shows a better luminous effect. In this application, the whole outer ring periphery 22 grows through the light guiding. In such cases, only a handful of LEDs 1 are required to make the whole outer ring periphery 22 have a good luminous ornamental effect. Therefore, the frisbee provided herein has an outer ring periphery showing a good luminous ornamental effect, a simple overall structure, a low overall cost, and better practicality.

A surface of each of the plurality of light-guiding ribs 6 and an inner side of the outer ring periphery 22 are both configured as opaque. Therefore, the light emitted by the LED 1 can only be transmitted outwards from an outer side of the outer ring periphery 22, that is, only the outer side of the outer ring periphery 22 can emit light, which can further enhance the light-emitting effect of the frisbee.

A cover 7 is provided at the center of the central disc portion 21, and the plurality of LEDs 1 are arranged in the cover 7. The number of the light-guiding rib 6 is the same as the number of the LED 1. The plurality of light-guiding ribs 6 are uniformly arranged along a circumferential direction of the outer ring periphery, and are in one-to-one correspondence to the plurality of LEDs 1. By this arrangement, the overall luminous effect of the outer ring periphery 22 is more uniform and good-looking. In this embodiment, the number of the LED 1 and the light-guiding rib are both four. In other embodiments, the number of the LED 1 and the light-guiding rib 6 can be both one or other numbers, and can also be different.

The main body 2 consists of a disc body 3 and a ring body 4. The disc body 3 includes a disc portion 31 and an inner frame portion 32. The ring body 4 includes an outer frame portion 41. The outer frame portion 41 of the ring body 4 is sleeved on an outer side of the inner frame portion 32 of the disc body 3. The central disc portion 21 is formed by the disc portion 31 of the disc body 3. The outer ring periphery 22 is formed by the outer frame portion 41 of the ring body 4.

The disc body 3 is formed by integral injection molding. The ring body 4 and the light-guiding rib are formed by integral injection molding. The disc body 3 is made of polyethylene, which is opaque. By preparing the inner frame portion 32 of the disc body 3 from a light-guide material, the inner side of the outer ring periphery 22 can be opaque. The ring body 4 and the light-guiding rib are formed by integral injection molding using a light-guide material. The light-guide material is thermoplastic polyurethane (TPU) or thermoplastic elastomer (TPE). By coating an opaque paint on a surface of the light-guiding rib 6, the surface of the light-guiding rib 6 can be opaque. Obviously, in other embodiments, the surface of the light-guiding rib 6 and the inner side of the outer ring periphery 22 can also be opaque through other means, such as applying an opaque film to the surface of the light-guiding rib 6 and the inner side of the outer ring periphery 22.

The frisbee provided herein also includes a vibration detection module 8, which is configured detect movement states of the frisbee. By this arrangement, when the frisbee is moving, it glows, and when the frisbee is stopped, it stops glowing. In such cases, the frisbee becomes more playful.

The frisbee provided herein also includes a light control button 9. The light control button 9 is configured to adjust the light brightness, time, and mode of the LED 1, rendering the frisbee a richer light effect and a better appreciation.

The frisbee provided herein also includes a charging interface 10 configured for charging the battery 5. By this arrangement, it is not necessary to frequently replace the battery 5, thus improving the practicality of the frisbee. A waterproof rubber plug 11 is provided on the position where the charging interface 10 is located to cover the charging interface 10, which can prevent the frisbee from damage due to the water entering from the charging interface 10 and the internal circuit. Therefore, the overall service life of the frisbee can be guaranteed.

The frisbee provided herein also includes a clamping buckle 12. The clamping buckle includes a clamping portion 121 for clamping with the main body 2, and a hanging portion 122 for hanging of the frisbee.

The operating principle of the frisbee is described below.

The light emitted from the LED 1 arranged on the central disc portion 21 is directed to one end of the light-guiding rib 6 and then to the outer ring periphery 22 through the light-guiding rib, so as to render the outer ring periphery 22 luminous. In this application, the whole outer ring periphery 22 grows through light guiding. In such case, only a handful of LEDs 1 are required to make the whole outer ring periphery 22 have a good luminous ornamental effect. Therefore, the frisbee provided herein not only exhibits a good luminous effect at its outer ring periphery, but also has a simple overall structure, a low production cost, and better practicability.

Described above are merely preferred embodiments of the present disclosure, which are not intended to limit the disclosure. It should be understood that any changes, replacements and modifications made by those skilled in the art without departing from the spirit of the disclosure shall fall within the scope of the present disclosure defined by the appended claims.

What is claimed is:

1. A frisbee, comprising:

a main body having a central disc portion and an outer ring periphery surrounding the central disc portion;

a plurality of light-emitting diodes (LEDs) arranged on the central disc portion;

a plurality of light-guiding ribs provided in the central disc portion, one end of each of the plurality of light-guiding ribs arranged close to the plurality of LEDs, and the other end of each of the plurality of light-guiding ribs connected to the outer ring periphery; and a battery;

wherein the plurality of light-guiding ribs and the outer ring periphery are both made of a light-guide material; and the main body consists of a disc body and a ring body; the disc body comprises a disc portion and an inner frame portion; the ring body comprises an outer frame portion; the outer frame portion of the ring body is sleeved on an outer side of the inner frame portion of the disc body; the central disc portion is formed by the disc portion of the disc body; and the outer ring periphery is formed by the outer frame portion of the ring body.

2. The frisbee of claim 1, wherein a surface of each of the plurality of light-guiding ribs and an inner side of the outer ring periphery are both configured as opaque.

3. The frisbee of claim 1, wherein the plurality of light-guiding ribs are uniformly arranged along a circumferential direction of the outer ring periphery.

4. The frisbee of claim 1, wherein the number of the plurality of light-guiding ribs is the same as the number of the plurality of LEDs; and the plurality of LEDs are in one-to-one correspondence to the plurality of light-guiding ribs.

5. The frisbee of claim 1, wherein the disc body is formed by integral injection molding; and the ring body and the plurality of light-guiding ribs are formed by integral injection molding.

6. The frisbee of claim 1, further comprising:

a vibration detection module.

7. The frisbee of claim 1, further comprising:

a light control button.

8. The frisbee of claim 1, further comprising:

a charging interface configured for charging of the battery;

wherein a waterproof rubber plug is provided on a position where the charging interface is located to cover the charging interface.

9. The frisbee of claim 1, wherein the light-guide material is thermoplastic polyurethane (TPU) or thermoplastic elastomer (TPE).

10. The frisbee of claim 1, further comprising:

a cover provided in the central disc portion;

wherein the plurality of LEDs are arranged in the cover.

11. The frisbee of claim 10, wherein the cover is provided at a center of the central disc portion.

12. A frisbee, comprising:

a main body having a central disc portion and an outer ring periphery surrounding the central disc portion;

a plurality of LEDs arranged on the central disc portion;

a plurality of light-guiding ribs provided in the central disc portion, one end of each of the plurality of light-guiding ribs arranged close to the plurality of LEDs, and the other end of each of the plurality of light-guiding ribs connected to the outer ring periphery;

a battery; and a clamping buckle;

wherein the plurality of light-guiding ribs and the outer ring periphery are both made of a light-guide material; and the clamping buckle comprises a clamping portion and a hanging portion; the clamping portion is configured for clamping with the main body; and the hanging portion is configured for hanging of the frisbee.

13. The frisbee of claim 12, further comprising:

a cover provided in the central disc portion;

wherein the plurality of LEDs are arranged in the cover.

14. The frisbee of claim 12, wherein the plurality of light-guiding ribs are uniformly arranged along a circumferential direction of the outer ring periphery.

15. The frisbee of claim 12, wherein the number of the plurality of light-guiding ribs is the same as the number of the plurality of LEDs; and the plurality of LEDs are in one-to-one correspondence to the plurality of light-guiding ribs.

16. The frisbee of claim 12, wherein a surface of each of the plurality of light-guiding ribs and an inner side of the outer ring periphery are both configured as opaque.

17. The frisbee of claim 16, wherein the cover is provided at a center of the central disc portion.

18. The frisbee of claim 12, wherein the main body consists of a disc body and a ring body; the disc body comprises a disc portion and an inner frame portion; the ring body comprises an outer frame portion; the outer frame portion of the ring body is sleeved on an outer side of the inner frame portion of the disc body; the central disc portion is formed by the disc portion of the disc body; and the outer ring periphery is formed by the outer frame portion of the ring body.

19. The frisbee of claim 18, wherein the disc body is formed by integral injection molding; and the ring body and the plurality of light-guiding ribs are formed by integral injection molding.

* * * * *